(12) United States Patent
Manahan et al.

(10) Patent No.: US 9,553,389 B2
(45) Date of Patent: *Jan. 24, 2017

(54) ACTIVE COOLING OF ELECTRICAL CONNECTORS

(71) Applicant: Cooper Technologies Company, Houston, TX (US)

(72) Inventors: Joseph Michael Manahan, Manlius, NY (US); Adam Ledgerwood, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,488

(22) Filed: Dec. 4, 2014

(65) Prior Publication Data
US 2015/0087181 A1    Mar. 26, 2015

Related U.S. Application Data

(63) Continuation-in-part of application No. 13/744,125, filed on Jan. 17, 2013, now Pat. No. 8,926,360.

(51) Int. Cl.
| | |
|---|---|
| *H05K 7/20* | (2006.01) |
| *H01R 13/46* | (2006.01) |
| *H01R 13/53* | (2006.01) |

(52) U.S. Cl.
CPC ............. *H01R 13/46* (2013.01); *H01R 13/53* (2013.01)

(58) Field of Classification Search
CPC .................................................... H05K 1/0201
(Continued)

(56) References Cited

U.S. PATENT DOCUMENTS

| | | |
|---|---|---|
| 203,931 A | 5/1878 | Nickerson |
| 377,237 A | 1/1888 | Cole |

(Continued)

FOREIGN PATENT DOCUMENTS

| | | |
|---|---|---|
| EP | 0449737 | 10/1991 |
| JP | 1017382 | 1/1989 |

(Continued)

OTHER PUBLICATIONS

Surikov, S., International Search Report and Written Opinion of the International Searching Authority for PCT/US2014/011254, May 5, 2014, pp. 1-7.

*Primary Examiner* — Neil Abrams
(74) *Attorney, Agent, or Firm* — King & Spalding LLP

(57) ABSTRACT

An electrical connector having an active cooling system is described herein. The electrical connector can include a conductor having an electrically conductive pin, and a conductor receiver slidably coupled to the conductor. The conductor receiver can include a wall having an electrically conductive material forming a cavity into which the pin is received. The conductor receiver can also include an insulating sleeve mechanically coupled to the wall. The conductor receiver can further include a heat sink mechanically coupled to the insulating sleeve and a channel that collects heat absorbed by the heat sink. The heat collected by the channel can be vented outside the conductor receiver. Alternatively, the wall of the conductor receiver can be coupled to an insulator and have at least one aperture that vents heat from the cavity to the insulator.

19 Claims, 12 Drawing Sheets

(58) Field of Classification Search
USPC .................................................. 439/485, 487
See application file for complete search history.

(56) References Cited

U.S. PATENT DOCUMENTS

| | | | |
|---|---|---|---|
| 1,650,546 A * | 11/1927 | Strahan | H01T 21/02 |
| | | | 123/169 PH |
| 1,657,253 A | 1/1928 | Fortin | |
| 1,697,503 A | 1/1929 | Hollwitz | |
| 1,719,288 A | 7/1929 | Danielson | |
| 1,956,037 A | 4/1934 | MacDonald | |
| 2,269,314 A | 1/1942 | MacDonald | |
| 2,393,083 A | 1/1946 | Wisegarver | |
| 2,456,764 A | 12/1948 | Bach et al. | |
| 2,521,722 A | 9/1950 | Hubbell et al. | |
| 2,567,727 A | 9/1951 | Quackenbush | |
| 2,704,357 A * | 3/1955 | Johnson | H01R 24/76 |
| | | | 174/151 |
| 2,794,964 A | 6/1957 | Hoffman | |
| 2,877,437 A | 3/1959 | Flanagan, Jr. | |
| 2,930,023 A | 3/1960 | Earl | |
| 2,997,530 A * | 8/1961 | Rosan | H01B 17/306 |
| | | | 174/153 R |
| 2,997,681 A | 8/1961 | Klassen | |
| 3,002,166 A * | 9/1961 | Weinschel | H01P 1/225 |
| | | | 333/33 |
| 3,094,365 A | 6/1963 | Chamberlain et al. | |
| 3,122,408 A | 2/1964 | Laszczewski | |
| 3,171,183 A | 3/1965 | Johnston | |
| 3,182,281 A | 5/1965 | Salz, Sr. | |
| 3,275,970 A | 9/1966 | Johanson et al. | |
| 3,325,775 A | 6/1967 | Zak | |
| 3,350,681 A | 10/1967 | Benoit et al. | |
| 3,394,341 A | 7/1968 | Venn | |
| 3,439,294 A | 4/1969 | Flanagan et al. | |
| 3,569,903 A | 3/1971 | Brishka | |
| 3,596,231 A | 7/1971 | Melton | |
| 3,605,074 A | 9/1971 | Freggens | |
| 3,678,444 A * | 7/1972 | Stevens | H01R 24/52 |
| | | | 439/551 |
| 3,697,934 A | 10/1972 | Merry | |
| 3,792,418 A | 2/1974 | Kailus | |
| 3,798,586 A | 3/1974 | Huska | |
| 3,829,820 A | 8/1974 | Hubner et al. | |
| 3,912,353 A | 10/1975 | Kasuya et al. | |
| 3,976,352 A | 8/1976 | Spinner | |
| 4,195,902 A | 4/1980 | Caveney et al. | |
| 4,341,432 A * | 7/1982 | Cutchaw | 439/485 |
| 4,405,195 A | 9/1983 | Cherry et al. | |
| 4,432,038 A | 2/1984 | Bell | |
| 4,445,747 A | 5/1984 | Neidich | |
| 4,530,553 A | 7/1985 | Aujla | |
| 4,560,222 A | 12/1985 | Dambach | |
| 4,597,620 A | 7/1986 | Lindner et al. | |
| 4,655,526 A | 4/1987 | Shaffer | |
| 4,684,193 A | 8/1987 | Havel | |
| 4,780,799 A | 10/1988 | Groh | |
| 4,781,611 A | 11/1988 | Leonard | |
| 4,887,353 A | 12/1989 | Preputnick | |
| 4,906,212 A | 3/1990 | Mixon, Jr. | |
| 5,007,858 A | 4/1991 | Daly et al. | |
| 5,217,392 A | 6/1993 | Hosler, Sr. | |
| 5,224,918 A | 7/1993 | Neumann et al. | |
| 5,263,874 A | 11/1993 | Miller | |
| 5,309,983 A | 5/1994 | Bailey | |
| 5,391,089 A | 2/1995 | Quickel et al. | |
| 5,397,858 A | 3/1995 | Delalle | |
| 5,433,622 A | 7/1995 | Galambos | |
| 5,482,480 A | 1/1996 | Miyazaki | |
| 5,514,001 A | 5/1996 | Szegda | |
| 5,551,884 A | 9/1996 | Burkhart, Sr. | |
| 5,601,443 A | 2/1997 | Stinsky et al. | |
| 5,735,716 A | 4/1998 | Bilezikjian | |
| 5,898,569 A | 4/1999 | Bhatia | |
| 5,947,753 A | 9/1999 | Chapman et al. | |
| 6,002,585 A | 12/1999 | Leeb | |
| 6,007,388 A * | 12/1999 | Kooiman | H01R 13/052 |
| | | | 439/825 |
| 6,039,614 A | 3/2000 | Ramari | |
| 6,062,919 A | 5/2000 | Trafton | |
| 6,151,203 A * | 11/2000 | Shamouilian | H01L 21/6833 |
| | | | 361/234 |
| 6,257,911 B1 | 7/2001 | Shelby et al. | |
| 6,575,776 B1 | 6/2003 | Conner et al. | |
| 6,582,251 B1 * | 6/2003 | Burke | H01R 13/5202 |
| | | | 439/589 |
| 6,602,091 B2 | 8/2003 | Belady et al. | |
| 6,612,857 B2 | 9/2003 | Tolmie | |
| 6,712,621 B2 | 3/2004 | Li et al. | |
| 6,714,809 B2 | 3/2004 | Lee et al. | |
| 6,733,324 B1 * | 5/2004 | Lecsek | H01R 24/40 |
| | | | 361/704 |
| 6,736,668 B1 | 5/2004 | Kholodenko et al. | |
| 6,860,743 B2 | 3/2005 | Ekkul et al. | |
| 6,953,348 B2 | 10/2005 | Yanagisawa et al. | |
| 7,128,604 B2 | 10/2006 | Hall | |
| 7,134,906 B2 | 11/2006 | Lawton et al. | |
| 7,217,154 B2 | 5/2007 | Harwath | |
| 7,252,564 B1 * | 8/2007 | Morello | H01R 4/185 |
| | | | 439/843 |
| 7,264,485 B2 | 9/2007 | Larsen et al. | |
| 7,291,030 B2 | 11/2007 | Mohs | |
| 7,357,657 B2 | 4/2008 | Wells | |
| 7,422,471 B1 | 9/2008 | Wu | |
| 7,442,081 B2 | 10/2008 | Burke et al. | |
| 7,473,142 B2 | 1/2009 | Chien et al. | |
| 7,476,108 B2 | 1/2009 | Swain et al. | |
| 7,541,135 B2 | 6/2009 | Swain | |
| 7,597,573 B2 | 10/2009 | Defibaugh et al. | |
| 7,641,506 B2 | 1/2010 | Sacher et al. | |
| 7,690,941 B2 | 4/2010 | Caveney et al. | |
| 7,699,634 B2 | 4/2010 | Kholodenko et al. | |
| 7,705,238 B2 * | 4/2010 | Van Swearingen | H01P 1/30 |
| | | | 174/102 R |
| 7,726,982 B2 | 6/2010 | Ngo | |
| 7,828,572 B1 | 11/2010 | Liu | |
| 7,833,023 B2 | 11/2010 | Di Stefano | |
| 7,854,063 B2 | 12/2010 | Harwath | |
| 8,083,539 B2 | 12/2011 | Suzuki et al. | |
| 8,382,509 B2 | 2/2013 | David et al. | |
| 8,414,327 B2 * | 4/2013 | Mana | H01R 13/533 |
| | | | 439/578 |
| 8,585,438 B2 | 11/2013 | Tang | |
| 8,587,946 B2 | 11/2013 | Lee et al. | |
| 8,613,626 B1 | 12/2013 | Phan | |
| 8,845,350 B2 | 9/2014 | Connell | |
| 8,926,360 B2 * | 1/2015 | Manahan | H01R 13/46 |
| | | | 439/485 |
| 2004/0181177 A1 | 9/2004 | Lee et al. | |
| 2007/0259537 A1 | 11/2007 | Kohlstrung | |
| 2012/0052720 A1 | 3/2012 | David et al. | |
| 2012/0058670 A1 | 3/2012 | Regnier et al. | |
| 2012/0115363 A1 | 5/2012 | Myong | |
| 2012/0258624 A1 | 10/2012 | Oh | |
| 2014/0071680 A1 | 3/2014 | Hayashi et al. | |
| 2014/0199881 A1 | 7/2014 | Manahan et al. | |

FOREIGN PATENT DOCUMENTS

| | | |
|---|---|---|
| JP | 2005056770 | 3/2005 |
| SU | 1576949 | 7/1990 |
| WO | 9311584 | 6/1993 |
| WO | 9517027 | 6/1995 |
| WO | 2008050184 | 5/2008 |

* cited by examiner

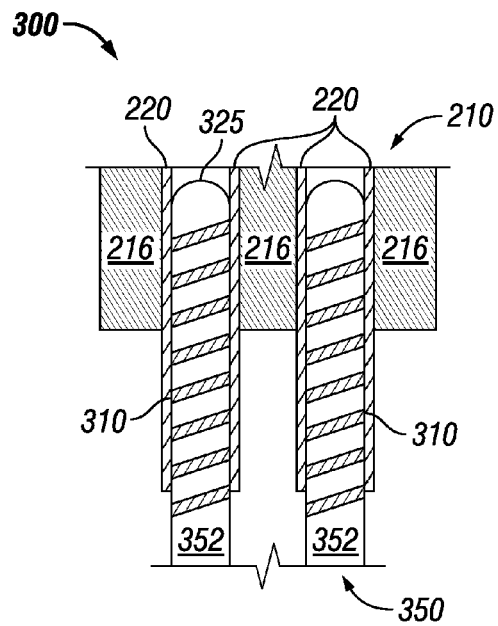
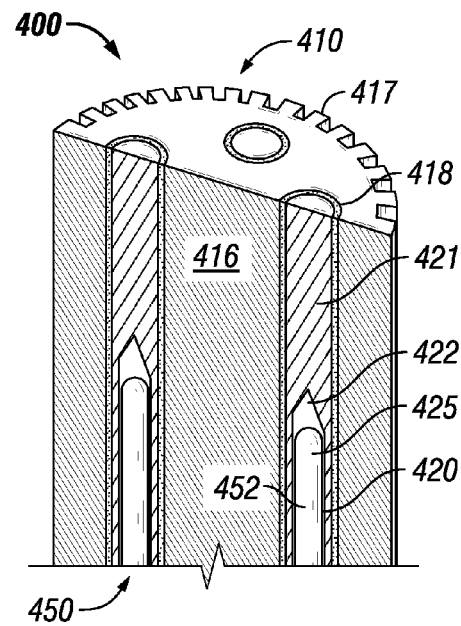
FIG. 3          FIG. 4
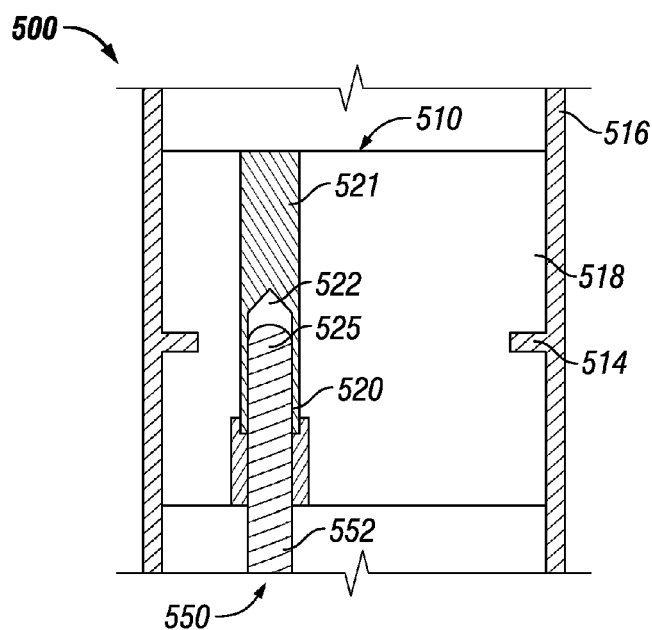
FIG. 5

ACTIVE COOLING OF ELECTRICAL CONNECTORS

RELATED APPLICATIONS

The present application is a continuation-in-part application of and claims priority under 35 U.S.C. §120 to U.S. patent application Ser. No. 13/744,125 (now U.S. Pat. No. 8,926,360), titled "Active Cooling of Electrical Connectors," filed Jan. 17, 2013, which is incorporated herein by reference.

The present application is also related to U.S. patent application Ser. No. 13/744,058, titled "Reduced Temperature Rise of Electrical Connectors," filed on Jan. 17, 2013.

TECHNICAL FIELD

The present disclosure relates generally to electrical connectors and more particularly to systems, methods, and devices for active cooling of an electrical connector.

BACKGROUND

Electrical connectors are used in a number of different electrical applications. For example, electrical connectors are used in households, commercial facilities, and industrial sites. Electrical connectors can be used for a number of different applications, including but not limited to lighting, electronics, appliances, motors, fans, and control centers. Each electrical connector is rated for a certain voltage and/or current. As the current and/or voltage rating of a connector increases, the size of the conductors increase. Correspondingly, the size (e.g., length, width) of the pins (also called and/or electrically and mechanically coupled to conductors) and receivers (also called pin receivers or conductor receivers) of the mating connector components also increases.

When a conductor is not properly connected to a conductor receiver and/or when an electrical connector is used to conduct higher power levels, one or more of a number of electrically-related problems can arise. For example, when voltage is applied to a conductor that is not properly connected to a conductor receiver, overheating (even to the extent of a fire) can result. Also, to compensate for the temperature rise, conductors and a corresponding electrical connector can be sized larger than actually needed so that the proper amount of voltage and/or current, net of losses from an inadequate connection between the conductor and conductor receiver, is delivered. In addition, if the components of the electrical connector are mechanically coupled and decoupled on a relatively frequent basis, the parts (e.g., conductor, conductor receiver) may wear more quickly because of the inadequate connection between the conductor and the conductor receiver, causing subsequent connections to generate more heat from energy that is not conducted because of the inadequate connection.

SUMMARY

In general, in one aspect, the disclosure relates to an electrical connector. The electrical connector can include a conductor having a pin that is electrically conductive. The electrical connector can also include a conductor receiver mechanically coupled to the conductor. The conductor receiver can include a wall having an electrically conductive material forming a cavity into which the pin is received and mechanically coupled. The conductor receiver can also include an insulating sleeve mechanically coupled to an outer surface of the wall. The conductor receiver can further include a heat sink mechanically coupled to an outer surface of the insulating sleeve. The conductor receiver can also include a channel disposed within the heat sink, where the channel collects heat absorbed by the heat sink. The heat collected by the channel can be ventilated outside the conductor receiver.

In another aspect, the disclosure can generally relate to an electrical connector. The electrical connector can include a conductor comprising a pin that is electrically conductive. The electrical connector can also include a conductor receiver mechanically coupled to the conductor. The conductor receiver can include a wall having an electrically conductive material forming a cavity into which the pin is received at a distal end and mechanically coupled, where the wall has a at least one aperture at a proximal end. The conductor receiver can also include a heat sink mechanically coupled to an outer surface of the wall. The at least one aperture can vent heat from the cavity to the heat sink.

In yet another aspect, the disclosure can generally relate to a method for cooling an electrical connector. The method can include receiving a pin into a cavity of a conductor receiver, where at least one of the pin and the conductor receiver are electrically energized, and where the cavity is defined by a wall. The method can also include transferring heat generated by coupling the pin and the conductor receiver from the wall of the conductor receiver to an insulating sleeve. The method can further include transferring the heat from the insulating sleeve to a heat sink, and venting the heat outside the electrical connector using a channel in the heat sink.

In still another aspect, the disclosure can generally relate to a method for cooling an electrical connector. The method can include mechanically coupling a conductive lead to a proximal end of a conductor receiver, where the proximal end of the conductor receiver has at least one aperture. The method can also include receiving, at a distal end of the conductor receiver, a pin into a cavity of a conductor receiver, where at least one of the pin and the conductor receiver are electrically energized, and where the cavity is defined by a wall. The method can further include transferring, through the at least one aperture, heat generated by mechanically coupling the pin and the conductor receiver from the cavity of the conductor receiver to a heat sink.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 3 shows a variation of the alternative example electrical connector of FIG. 2, in accordance with certain example embodiments.

FIG. 4 shows another alternative example electrical connector in accordance with certain example embodiments.

FIG. 5 shows yet another alternative example electrical connector in accordance with certain example embodiments.

DETAILED DESCRIPTION

Figure 1A:
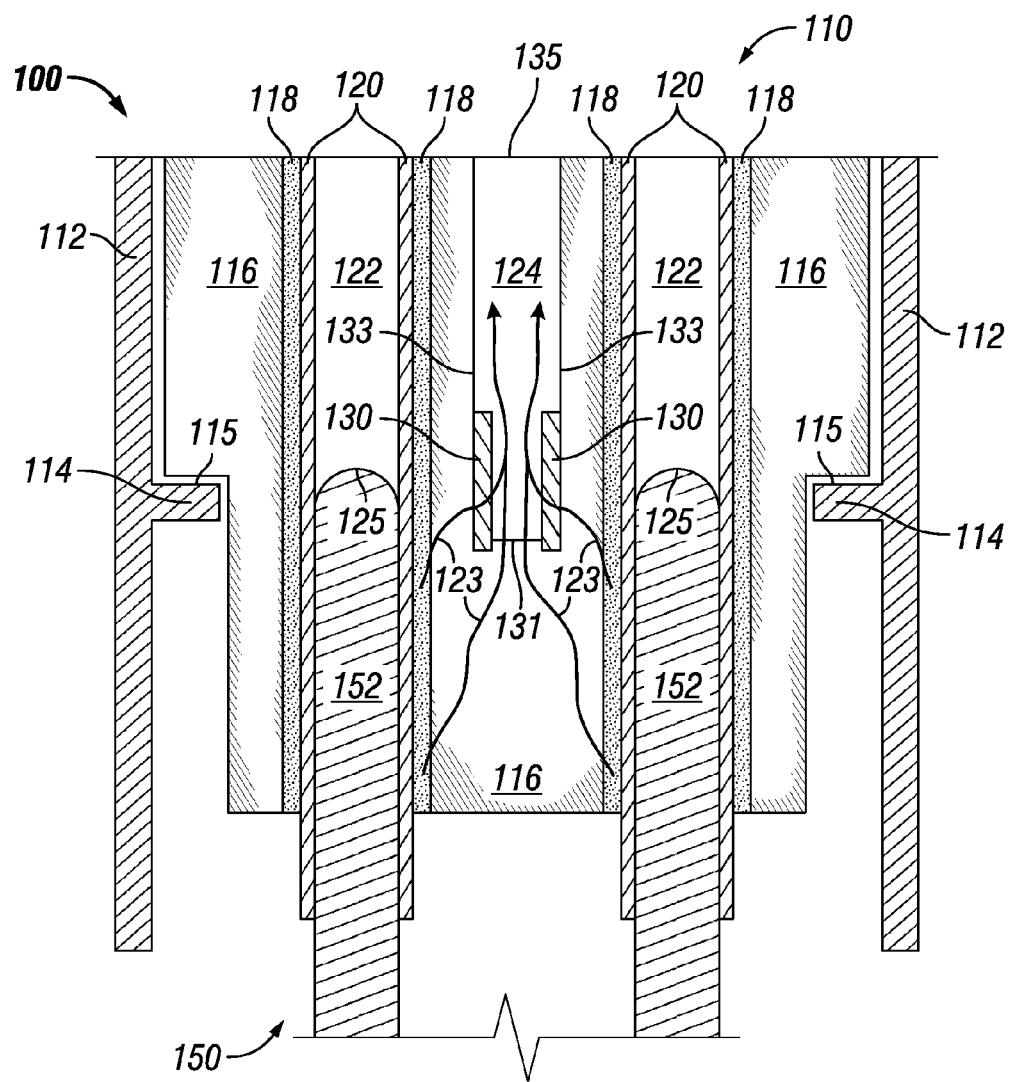
FIGS. 1A and 1B show a cross-sectional side view and a top view, respectively, of an example electrical connector in accordance with certain example embodiments.

Example embodiments of active cooling of electrical connectors will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects of the invention and are not meant to limit embodiments described herein.

In general, example embodiments provide systems, methods, and devices for active cooling of electrical connectors. Specifically, example embodiments provide for actively cooling inner portions of an electrical connector by removing heat generated by power flowing between a conductor and a conductor receiver within the electrical connector. By removing heat generated by power flowing between a conductor and a conductor receiver, the temperature rise at the connection point(s) is lowered. As a result, the conductor and conductor receiver experience less wear and last longer using example embodiments described herein. Wear of the conductor and/or conductor receiver, however, are inevitable, and so example embodiments can help mitigate the effects of the thermal losses caused by such wear. An electrical connector may involve a single conductor mated with a single conductor receiver. Alternatively, an electrical connector can also involve multiple conductors and/or multiple conductor receivers. An electrical connector may be used in a stand-alone application (e.g., feeding a junction box) or integrated with an electrical device (e.g., a control center, a motor).

Example electrical connectors discussed herein can be used with one or more of a number of voltages and/or currents. For example, an electrical connector using an active cooling system can be used for a 115 VAC wall outlet in a residential structure. As another example, an electrical connector using an active cooling system can be used for a 400 A service to a large motor.

A user may be any person that interacts with an electrical connector using active cooling. Examples of a user may include, but are not limited to, an engineer, an electrician, an instrumentation and controls technician, a mechanic, an operator, a consultant, a contractor, and a manufacturer's representative.

In certain example embodiments, an electrical connector using active cooling (and/or an electrical device with which an electrical connector using active cooling is integrated) is subject to meeting certain standards and/or requirements. For example, the National Electric Code (NEC) and the Institute of Electrical and Electronics Engineers (IEEE) set standards as to wiring and electrical connections. As another example, the National Electrical Manufacturer's Association (NEMA) classifies electrical connectors by current ratings (e.g., 15 A, 60 A), voltage ratings (e.g., 125V, 600V), conductor dimensions (e.g., widths, shapes, orientation), grounding requirements, and other factors. Use of example embodiments described herein meet (and/or allow a corresponding device to meet) such standards when required.

Figure 1B:
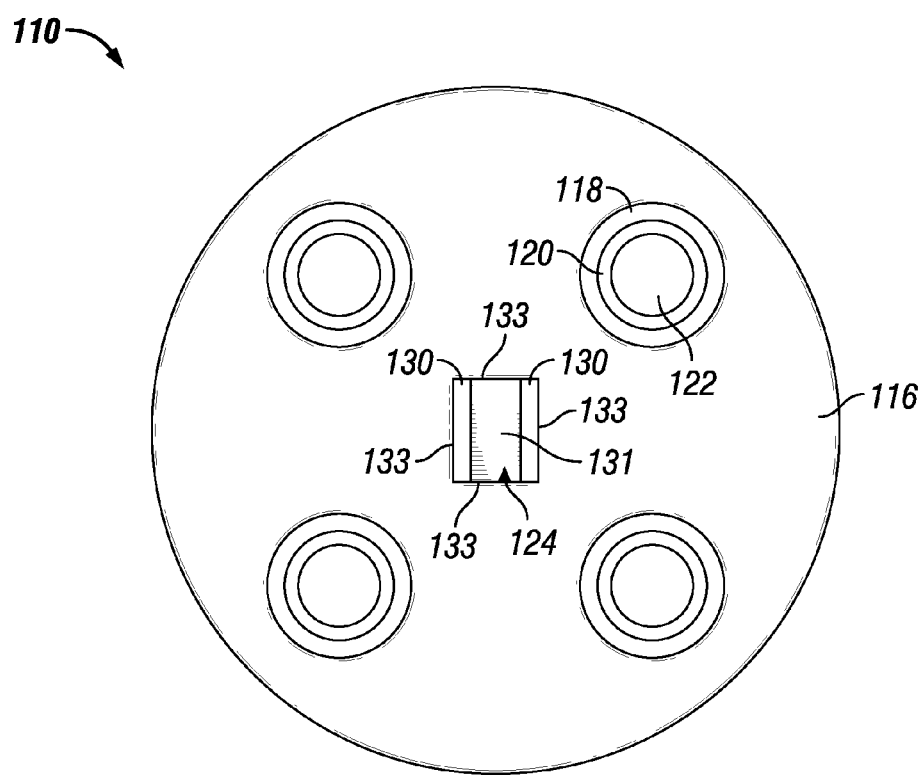

FIGS. 1A and 1B show a cross-sectional side view and a top view, respectively, of a portion of an electrical connector 100 using certain example embodiments described herein. In one or more embodiments, one or more of the components shown in FIGS. 1A and 1B may be omitted, repeated, and/or substituted. Accordingly, embodiments of electrical connectors using active cooling should not be considered limited to the specific arrangements of components shown in FIGS. 1A and 1B.

Referring now to FIGS. 1A and 1B, an example of a portion of the electrical connector 100 includes a conductor 150 and a conductor receiver 110. The portion of the electrical connector 100 shown in FIGS. 1A and 1B can have a single conductor/conductor receiver pair, or the conductor 150 and conductor receiver 110 can be one of a number (e.g., four, as shown in FIG. 1B) of conductor/conductor receiver pairs.

The conductor receiver 110 shown in FIGS. 1A and 1B includes a wall 120 that encloses a cavity 122. The wall 120 is at least part of a distal end of a female pin. The conductor receiver 110 can include one or more female pins. The proximal end of the female pin can also be the wall 120 (as shown in FIG. 1), or a solid or semi-solid mass of electrically conductive material. The wall 120 forms a cavity and has a receiver shape (e.g., circle, ellipse, square, triangle, hexagon, star) when viewed in cross section. The receiver shape of the wall 120 can have a shape substantially similar to the shape of the pin 152 (described below) that is inserted into the cavity formed by the wall 120. The receiver shape on the inner surface (inside) of the wall 120 has an inner perimeter. Likewise, the outer surface (outside) of the wall 120 can have an outer perimeter. The wall 120 of the conductor receiver 110 has a length, a width, and a thickness. The thickness of the wall 120 can vary or be substantially consistent along the length of the wall 120. Likewise, the width (e.g., the diameter of a circle in cross section, the length of the side of a square in cross section) can vary or be substantially consistent along the length of the wall 120.

The proximal end of the wall 120 (opposite from the end at which the pins 152 of the conductor 150 are received) can be mechanically coupled (directly or indirectly) to one or more of a number of electrical devices, including but not limited to a motor, a control center, and a transformer. In such a case, the wall 120 can be used to transfer power between the electrical device and the pin 152 of the conductor 150.

The wall 120 of the conductor receiver 110 can be made of one or more of a number of suitable materials, including metal (e.g., alloy, stainless steel), plastic, some other material, or any combination thereof. In certain example embodiments, at least a portion of the wall 120 (e.g., where the pin 152 of the conductor 150 couples (e.g., slidably, rotatably) to the wall 120) is made of an electrically conductive material that allows current and/or voltage to be transferred between the conductor 150 and the conductor receiver 110. In certain example embodiments, the wall 120 is made of a material that can withstand the heat generated by energy losses when power flows between the conductor 150 and the conductor receiver 110 when the conductor 150 and the conductor receiver 110 are mechanically coupled to each other.

In certain example embodiments, some or all of the outer surface of the wall 120 of the conductor receiver 110 is surrounded by an insulating sleeve 118. The insulating sleeve 118 can be made of one or more of a number of materials (e.g., plastic, nylon, rubber) that have dielectric integrity. In other words, the insulating sleeve 118 can be a poor conductor of electricity but an efficient supporter of electric fields while dissipating minimal energy in the form of heat.

The insulating sleeve 118 can have a length, a width, and a thickness. The thickness of the insulating sleeve 118 can vary or be substantially consistent along the length of the insulating sleeve 118. Likewise, the width (e.g., the thickness of a circle in cross section, the thickness of the side of a square in cross section) can vary or be substantially consistent along the length of the insulating sleeve 118. When viewed cross-sectionally, the shape of the insulating sleeve 118 can be the same or a different shape than the receiver shape formed by the wall 120. In certain example embodiments, the insulating sleeve 118 is made of a material that can withstand the heat (temperature rise) generated by the energy losses when power flows between the conductor 150 and the conductor receiver 110.

In certain example embodiments, some or all of the outer surface of the insulating sleeve 118 of the conductor receiver 110 is surrounded by a heat sink 116. The heat sink 116 can be made of one or more of a number of materials (e.g., aluminum, copper, a metal composite) that are thermally conductive. In certain example embodiments, the thermally conductive material of the heat sink 116 is also a dielectric material. The heat sink 116 can have one or more of a number of features (e.g., fins or other protrusions) (not shown) on its surface that increase the effective surface area of the heat sink 116.

The heat sink 116 can have one or more of a number of dimensions, including a length, a width, and a thickness. The thickness of the heat sink 116 can vary or be substantially consistent along the length of the heat sink 116. Likewise, the width (e.g., the thickness of a circle in cross section, the thickness of the side of a square in cross section) can vary or be substantially consistent along the length of the heat sink 116. When viewed cross-sectionally, the shape of the heat sink 116 can be the same or a different shape than the shape of the insulating sleeve 118. In certain example embodiments, the heat sink 116 is made of a material that can absorb and effectively transfer the heat (temperature rise) of the insulating sleeve 118, as generated by the energy losses when power flows between the conductor 150 and the conductor receiver 110.

In certain example embodiments, a channel 124 is disposed within at least one portion of the heat sink 116. The channel 124 collects heat 123 absorbed by the heat sink 116 and vents the heat 123 outside of the conductor receiver 110 and the electrical connector 100. The channel 124 can have any dimensions (e.g., length, width, height), varied or constant, necessary to vent the heat 123 from the heat sink 116 and the electrical connector 100. As examples, a channel 124 can be a perforation, a slit, a slot, or an open section of the heat sink 116. A channel 124 can have one or more of a number of characteristics, including but not limited to linear, curved, forked, and angled. In this case, as shown in FIGS. 1A and 1B, the channel 124 is a hole or bore defined by a bottom end 131, four side ends 133, and a top end 135, where the bottom end 131 and each of the side ends 133 is defined by the body of the heat sink 116, and the top end 135 is open and exposed to the outer perimeter of the heat sink 116. A channel 124 can include one or more channels integrated with each other, similar to one or more adjoining rivers found in nature.

A heat sink 116 can include only one or multiple channels 124. A channel 124 can be completely internal to the heat sink 116. Alternatively, or in addition, a channel 124 can have at least one end that is on the outer surface of the heat sink 116. The orientation of the one or more channels 124 is to channel the heat 123 radiated from the heat sink 116 to a location away the mechanical coupling of the conductor 150 and the conductor receiver 110. For example, the channels 124 may be oriented in a predominately vertical manner to allow the heat 123 to naturally rise from the heat sink 116 and/or be expelled from the electrical connector 100. Consequently, the temperature rise from the pin 152 to the wall 120 is lowered. In certain example embodiments, as with the example shown in FIGS. 1A and 1B, the channel 124 vents the heat 123 to a location outside (in this case, the top) of the electrical connector 100.

Optionally, the conductor receiver can include one or more cooling devices 130. A cooling device 130 can be any device, component, and/or feature that helps remove the heat 123 from the heat sink 116 and/or expel the heat from the electrical connector 100. The cooling device 130 can be a thermoelectric cooler. Examples of a cooling device 130 can include, but are not limited to, an air moving device (e.g., a fan, a piston) and a heat exchanger (e.g., a liquid circulator). If the cooling device 130 requires a power source to operate, the power source may be external to the electrical connector 100 (e.g., a battery, a separate power supply feeding the cooling device 130), or the power source can be taken from a portion of the power (using, for example, a transformer) that flows between the pin 152 and the wall 120 of the electrical connector 100.

In certain example embodiments, the conductor receiver 110 includes an outer component 112 that encases some or all of the inner components (e.g., the heat sink 116, the wall 120) of the conductor receiver 110. The outer component 112 can be any type of protective covering. The outer component 112 can include one or more features (e.g., slots, apertures, protrusions) that allow the heat 123 emitted by the heat sink 116 and collected by the channel 124 to exit the conductor receiver 110. The outer component 112 can be made of one or more of a number of materials, including but not limited to rubber, metal, plastic, nylon, and ceramic.

The outer component 112 can be coupled to the inner components in one or more of a number of ways (e.g., slidably, rotatably, fixedly) using one or more of a number of methods (e.g., epoxy, mating threads, slots, snap fittings, heat). For example, the heat sink 116 and the outer component 112 can have one or more coupling features (as shown in FIG. 1A, a recessed ledge 115 that surrounds at least a portion of the heat sink 116 and a complementary shelf protrusion 114 that extends inward along at least a portion of the outer component 112) that allow the heat sink 116 to couple to, and/or to fit within, the outer component 112 of the conductor receiver 110. In such a case, the ledge 115 and the protrusion 114 can be fixedly coupled (using, for example, epoxy), threadably coupled (using, for example, mating threads), or removeably coupled (using, for example, a snap fitting). Alternatively, the ledge 115 may rest upon the protrusion 114 without any additional coupling.

In certain example embodiments, the outer component 112 is integral with the heat sink 116. For example, the outer component 112 and the heat sink 116 can be a single piece made from a single mold. Alternatively, the outer component 112 can be mechanically coupled to the heat sink 116. If the outer component 112 is integral with the heat sink 116, then there may be no need for a cooling device 130 within the conductor receiver 110. As a result, cost savings can be achieved by not including the cooling device.

The conductor 150 of the electrical connector 100 shown in FIGS. 1A and 1B includes one or more pins 152. In this case, there are four pins 152. In certain example embodiments, each pin 152 is made of an electrically conductive material (e.g., copper, aluminum), which may be the same or a different electrically conductive material as the wall 120. The distal end 125 of the pin 152 is inserted into the cavity 122 formed by the wall 120, and the pin 152 slidably couples to at least a portion of the wall 120 of the conductor receiver 110.

The pin 152 can be a solid piece, include a number of strands that are bundled together, and/or be part of some other arrangement. In certain example embodiments, the pin 152 is positioned within a cavity 122 of the conductor receiver 110. The pin 152 has an outer perimeter and forms a shape when viewed in cross section. The shape of the pin 152 (pin shape) can be the same or a different shape as the receiver shape.

For example, the pin shape and the receiver shape can be a circle, where the outer perimeter of the pin 152 is slightly less than the inner perimeter of the wall 120. As another example, the pin shape can be an isosceles triangle, where the receiver shape is a six-pointed star formed by an isosceles triangle overlapped with an inverted isosceles triangle. In such a case, the outer perimeter of the pin 152 is slightly less than the perimeter of one of the isosceles triangles of the six-pointed star forming the receiver shape. When the conductor 150 is slidably and mechanically coupled to the conductor receiver 110, portions of the pin 152 contact portions of the wall 120. Where the pin 152 contacts the wall 120, electricity (e.g., current, voltage) is transferred between the wall 120 and the pin 152.

The proximal end of the pin 152 (opposite the distal end 125) can be mechanically coupled to one or more of a number of electrical devices, including but not limited to a motor, a control center, and a transformer. In such a case, the pin 152 can be used to transfer power between the electrical device and the wall 120 of the conductor receiver 110.

The pin 152 of the conductor 150 and the wall 120 of the conductor receiver 110 can be slidably coupled using one or more configurations that reduce the temperature rise of the electrical connector 100 in addition to the example active cooling systems described herein. Examples of two such configurations can be found in a patent application entitled "Reduced Temperature Rise of Electrical Connectors" and filed concurrently herewith and referenced above. The entire contents of the patent application entitled "Reduced Temperature Rise of Electrical Connectors" is fully incorporated herein by reference.

In certain example embodiments, the conductor receiver 110 is oriented so that the distal end of the wall 120 is at a lower point, from a horizontal perspective, than the proximal end of the wall 120. In such a case, heat 123 formed by the flow of power between the pin 152 and the wall 120 will rise toward the proximal end of the wall 120 and, thus, the top end of the conductor receiver 110.

Figure 2:
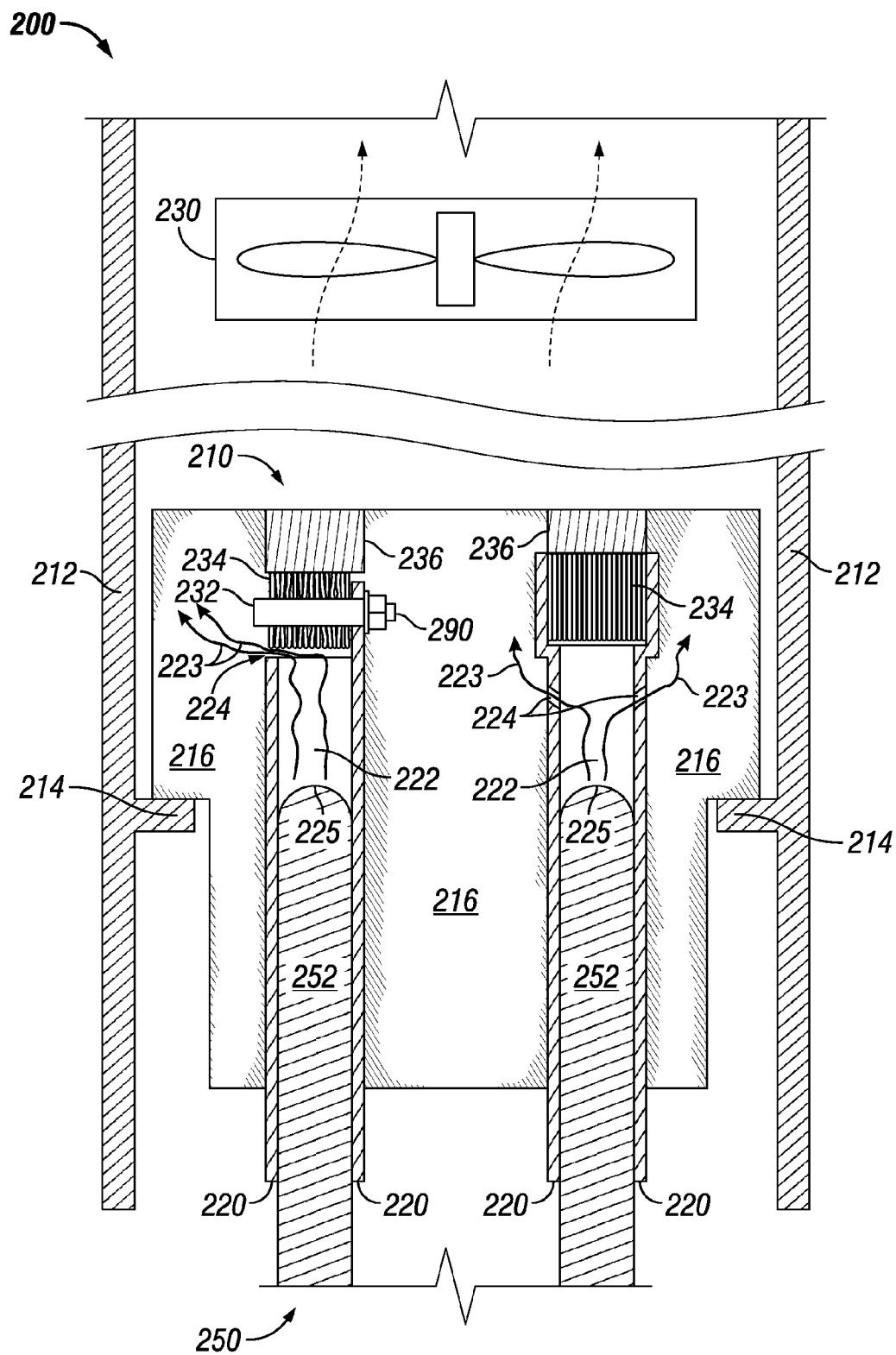
FIG. 2 shows an alternative example electrical connector in accordance with certain example embodiments.

FIG. 2 shows a cross-sectional side view of an alternative example electrical connector 200 in accordance with certain example embodiments. In one or more embodiments, one or more of the components shown in FIG. 2 may be omitted, repeated, and/or substituted. Accordingly, embodiments of electrical connectors using active cooling should not be considered limited to the specific arrangements of components shown in FIG. 2.

Referring now to FIG. 2, an example of a portion of the electrical connector 200 includes a conductor 250 and a conductor receiver 210. The conductor 250 is substantially the same as the conductor 150 described above with respect to FIGS. 1A and 1B. Further, the outer component 212 is substantially the same as the outer component 112 described above with respect to FIGS. 1A and 1B.

In certain example embodiments, the conductor receiver 210 does not include an insulating sleeve, as in FIGS. 1A and 1B above. In such a case, the wall 220 can be substantially the same as the wall 120 described above with respect to FIGS. 1A and 1B, with the following exceptions. First, in certain example embodiments, the proximal end of the wall 220 (further into the cavity 222) has one or more apertures 224 that traverse the wall 220. Such apertures 224 allow the heat 223 generated by losses resulting from the imperfect connection between the pin 252 and the wall 220 to drift outside of the cavity 222.

A second difference between the wall 220 of FIG. 2 and the wall 120 of FIGS. 1A and 1B (or at least not shown and described above with respect to the wall 120 of FIGS. 1A and 1B) is that, above the apertures 224 in the wall 220, the wall 220 is mechanically coupled to multiple strands 234 (also called the wires 234) of a conductive lead 236. Similar to what is described above with respect to the female pin in FIGS. 1A and 1B, the wall 220, the multiple strands 234, and the conductive lead 236 in FIG. 2 can all be part of a female pin. The conductive lead 236 can be made of an electrically conductive material (e.g., copper, aluminum), which may be the same or a different electrically conductive material as the wall 120. The wires 234 can be gathered and/or bundled proximate to the proximate end of the wall 220.

Where the bundle of wires 234 contacts the wall 220, electricity (e.g., current, voltage) is transferred between the wall 220 and the wires 234 of the conductive lead 236. The proximal end of the conductive lead 236 (opposite the distal end shown in FIG. 2) can be mechanically coupled to one or more of a number of electrical devices, including but not limited to a motor, a control center, and a transformer. In such a case, the wires 234 can be used to transfer power between the electrical device and the wall 220 of the conductor receiver 210.

The wires 234 of the conductive lead 236 can be mechanically coupled to the wall 220 in one or more of a number of ways. For example, as shown on the left side of FIG. 2, the wires 234 of the conductive lead 236 can be mechanically coupled to the wall 220 of the conductor receiver 210 using a wire clamp 232 that wraps around the wires 234 and is affixed to the wall 220. As another example, as shown on the right side of FIG. 2, the wires 234 of the conductive lead 236 can be mechanically coupled to the wall 220 of the conductor receiver 210 using solder. In such a case, the wires 234 can be compressed together against one side of the wall before being soldered to allow for more ventilation through the aperture 234 in the wall 220. As yet another example, the wires 234 of the conductive lead 236 can be mechanically coupled to the wall 220 of the conductor receiver 210 using a fastening device 290 (shown in FIG. 2 as a nut threadably coupled to a bolt) that traverses a hole in a plate and a hole in the wall 220. In such a case, the wires 234 are compressed between the plate and the wall 220 when the screw or other fastening device is tightened.

In the absence of an insulation sleeve, the heat sink 216 of the conductor receiver 210 is substantially similar to the heat sink 116 described above with respect to FIGS. 1A and 1B). One exception is that, in this FIG. 2, the heat sink 216 absorbs heat 223 from the wall 220 and/or the aperture 234 in the wall 220 rather than from the insulating sleeve. In such a case, some or all of the outer surface of the wall 220 of the conductor receiver 210 is surrounded by the heat sink 216.

In addition, the heat sink 216 may not include any channels, as in FIGS. 1A and 1B above. In such a case, the heat sink 216 transfers absorbed heat 223 at an outer surface of the heat sink 216. To assist in drawing off heat 223 from the heat sink 216, one or more cooling devices 230 can be used. In the absence of channels (e.g., channels 124 in FIG. 10 below) within the heat sink 216, each cooling device 230 can be located externally to the heat sink 216. For example, if the conductor receiver 210 protrudes through the wall of an electrical enclosure, the top portion of the conductor receiver 210 would be inside the enclosure, while the bottom portion of the conductor receiver 210 would be outside the enclosure. In such a case, the cooling device 230 can be located inside the enclosure proximate to the top portion of the conductor receiver 210.

The cooling device 230 can be substantially similar to the cooling devices 130 described above with respect to FIGS. 1A and 1B. In the example shown in FIG. 2, the cooling device 230 is an air moving device. More specifically, the cooling device 230 in FIG. 2 is a fan. If the cooling device 230 requires a power source to operate, the power source may be external to the electrical connector 200 (e.g., a battery, a separate power supply feeding the cooling device 130), or the power source can be taken from a portion of the power (using, for example, a transformer) that flows between the pin 252 and the wall 220 of the electrical connector 200.

In certain example embodiments, the conductor receiver 210 is oriented so that the distal end of the wall 220 is at a lower point, from a horizontal perspective, than the proximal end of the wall 220. In such a case, heat 223 formed by the flow of power between the pin 252 and the wall 220 will rise toward the proximal end of the wall 220 and, thus, the top end of the conductor receiver 210. In other words, the pin 252 is inserted at an upward angle relative to the cavity 222 within the wall 220 of the conductor receiver 210. Thus, the heat 223 rises toward the conductive lead 236 and the aperture 234 within the cavity 222. By ventilating the heat 223 through the wall 220 (i.e., the female pin) into the heat sink 216, a natural chimney effect is created to remove at least a portion of the heat 223 generated between the wall 220 and the pin 252 (i.e., the male pin).

Further, as with the example in FIGS. 1A and 1B above, the pin 252 of the conductor 250 and the wall 220 of the conductor receiver 210 can be slidably coupled using one or more configurations reducing the temperature rise of the electrical connector 200 in addition to the example active cooling systems described herein.

FIG. 3 shows a variation of the alternative example electrical connectors of FIG. 2, in accordance with certain example embodiments. Specifically, the example electrical connector 300 of FIG. 3 shows the pins 352 of the conductor having spiral serrations 310 that run along a portion of the length of the pins 352. Such serrations 310 can be cut, carved, etched, stamped, and/or otherwise disposed into a portion of the outer surface of the pin 352. Alternatively, the serrations 310 can be material that is added onto the outer surface of the pin 352. In addition, or in the alternative, serrations can be disposed into and/or added onto the inner surface of the wall 310.

Such serrations 310 can be spiral, linear along the length of the pin 352, have some other pattern and/or shape, or any combination thereof. The serrations 310 promote cool air from outside the connector 300 to flow upward around the contact surface of the pins 352 and the wall 220. In addition, or in the alternative, other features can be disposed along part or all of the pins 352 and/or the inner surface of the walls 220 to facilitate the flow of cooler air from outside the connector 300 to inside the connector 300. In addition, or in the alternative, such serrations 310 can be included in the wall 220 of the conductor receiver 210. Such features can be used with other types of connector configurations, including but not limited to FIGS. 1A, 1B, and 4-6C. The use of such serrations 310 can reduce the size and/or eliminate the existence of the apertures that traverse the wall 220, as described above with respect to FIG. 2. In certain example embodiments, such serrations 310 can be included in the conductive lead 236, as described above with respect to FIG. 2.

FIG. 4 shows another alternative example electrical connector 400 in accordance with certain example embodiments. Specifically, FIG. 4 shows a cross-sectional side perspective view of an example electrical connector 400. The components of FIG. 4 are substantially similar to the corresponding components of FIGS. 1A and 1B except as described below.

The wall 420, while still made of an electrically conductive material, may not extend along the entire length of the conductor receiver 410. For example, as shown in FIG. 4, the wall extends a slight amount above the distal end 425 of the pins 452 when the pins 452 are fully inserted into the conductor receiver 410. In other words, the cavity 422 may be shorter than the cavity described above with respect to FIGS. 1A and 1B. In such a case, above the cavity and inside the electrically insulating sleeve 418 is a conductor receiver base 421. The conductor receiver base 421 can be made of solid (or semi-solid) material that has electrically conductive properties.

In certain example embodiments, the electrically insulating sleeve 418 is thinner than the electrically insulating sleeve 118 of FIGS. 1A and 1B. The thinner layer of the electrically insulating sleeve 418 can promote more effective conduction to the heat sink 416. The electrically insulating sleeve 418 can be made of one or more of a number of materials, including but not limited to polyethylene terephalate (PETP). Such material can have a relatively high (approximately 5,000 volts/mil) dielectric strength. The thickness of the electrically insulating sleeve 418 can be less than 0.015 inches in certain example embodiments.

The electrically insulating sleeve 418 can be coupled to the heat sink 416, the wall, and/or the solid material 421 in one or more of a number of ways, including but not limited to epoxy, press fitting, and overmolding. Some coupling methods can cause a reduction in performance of the thermal properties of the electrically insulating sleeve 418. For example, if the electrically insulating sleeve 418 is press-fit to the heat sink 416, the electrically insulating sleeve 418 can have reduced thermal conductivity compared to when the electrically insulating sleeve 418 is overmolded to the heat sink 416.

The heat sink 416 can also have one or more protruding features along the outer perimeter of the heat sink 416. For example, as shown in FIG. 4, the heat sink 416 can have a number of rectangular fins 417 that extend vertically along at least a portion of the outer perimeter of the heat sink 416. Such protruding features can increase the surface area of the heat sink 416, which increases the thermal transfer of the heat absorbed by the heat sink to the ambient air (or some location away from the connector 400).

FIG. 5 shows yet another alternative example electrical connector 500 in accordance with certain example embodiments. Specifically, FIG. 5 shows a cross-sectional side view of an example electrical connector 500. The components of FIG. 5 are substantially similar to the corresponding components of FIG. 4 except as described below. In certain example embodiments, the conductor receiver base 521 is press-fit, overmolded, or otherwise inserted into the insulator body 518.

In addition, or in the alternative, instead of the conductor receiver base 521 being surrounded by a thin electrically insulating sleeve 418, as shown in FIG. 4, the conductor receiver base 521 can be disposed within an insulator body 518 made of a thermally conductive dielectric polymer. Examples of such a thermally conductive dielectric polymer can include, but is not limited to, CoolPoly® D5108 and glass-reinforced polyester. In addition, or in the alternative, the insulator body 518 can be molded into the heat sink 516 (also called a sleeve). (CoolPoly is a registered trademark of Cool Options, Inc. of North Kingstown, R.I.) The heat sink 516 can be made of one or more of a number of metals, including but not limited to aluminum.

When the insulator body 518 is molded into the heat sink 516, heat transfer from the insulator body 518 to the heat sink 516 can be improved by eliminating air boundary layers between the insulator body 518 and the heat sink 516. The heat sink 516 in FIG. 5 is shown having a smooth outer surface, although in an alternative example embodiment, the heat sink 516 can have fins or other types of protrusions, such as those shown in FIG. 4.

Figure 6A:
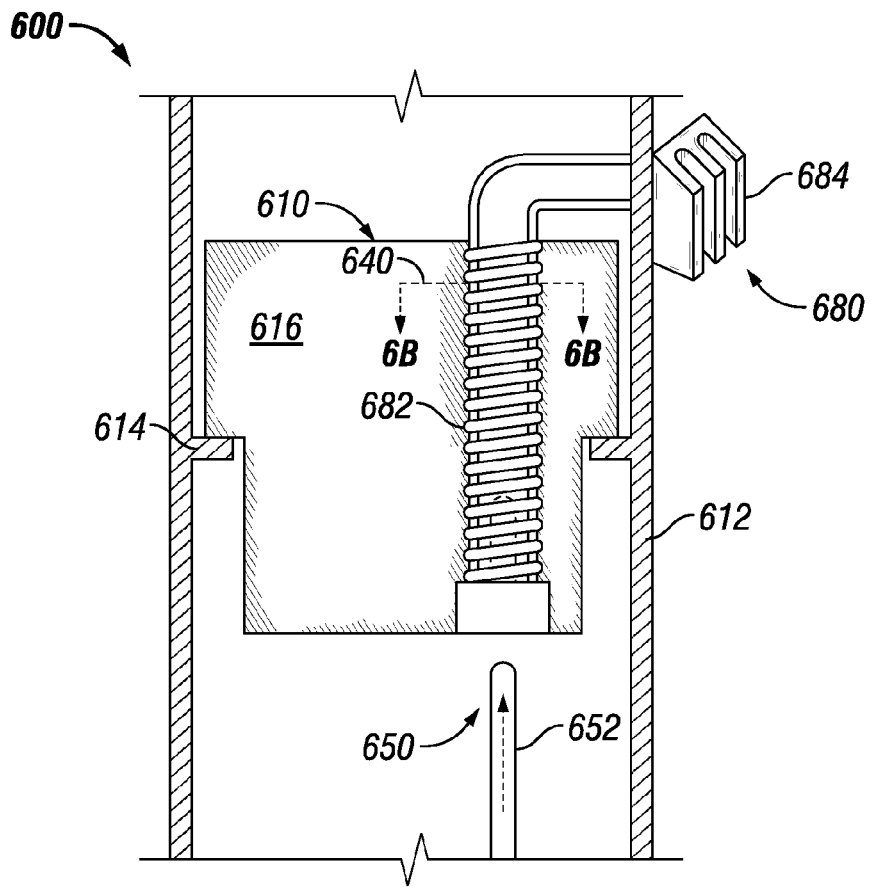
FIGS. 6A and 6B show still another alternative example electrical connector in accordance with certain example embodiments.
Figure 6B:
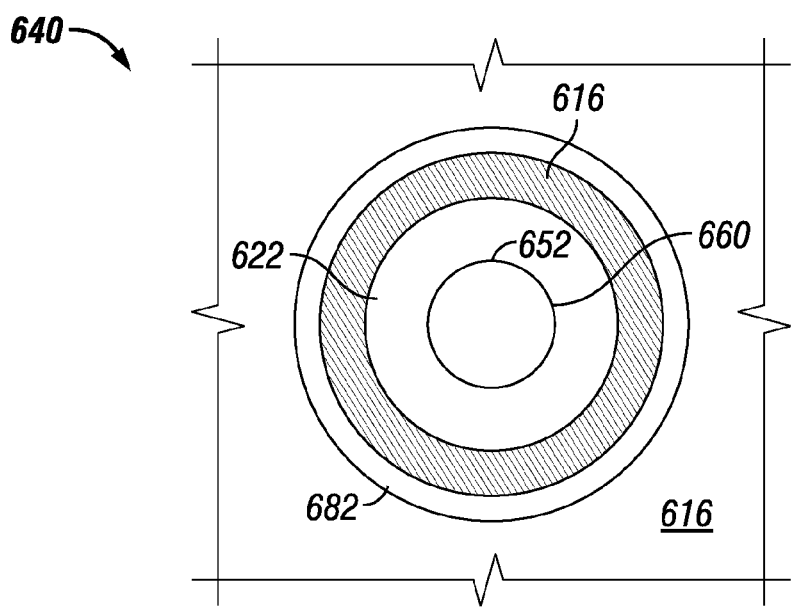

FIGS. 6A and 6B show still another alternative example electrical connector 600 in accordance with certain example embodiments. Specifically, FIG. 6A shows a cross-sectional side view of the example electrical connector 600, and FIG. 6B shows a cross-sectional top view of one of the a portion 640 of the electrical connector 600. The components of FIGS. 6A and 6B are substantially similar to the corresponding components of FIG. 5 except as described below.

Here, the wall 622 (also called, or part of, the female pin) is surrounded, at least in part, by a heat pipe 682. The heat pipe 682 can be one or more pipes that have a spiral shape (in a coiled form) along at least a portion of the length of the wall 622, a linear shape along at least a portion of the length of the wall 622, some other shape along at least a portion of the length of the wall 622, or a suitable combination thereof. In any case, the heat pipe 682 can be positioned adjacent to the area 660 where the pin 652 (the male pin) contacts the wall 622 (the female pin). In certain example embodiments, a thermally insulating material 616 can be positioned between the wall 622 and the heat pipe 682 and/or between the heat pipe 682 and the optional sleeve 612. If there is no sleeve 612, the thermally insulating material 616 can be molded to form the outer surface of the conductor receiver 610.

The heat pipe 682 is part of a heat dissipation system 680. The proximal ends of the heat pipe 682 can be coupled to an optional heat sink 684, which is another part of the heat dissipation system 680. The heat sink 684 can be positioned internal to the conductor receiver 610 and/or external to the conductor receiver 610. In the example embodiment shown in FIG. 6A, the heat sink 684 is mounted on the outside of the conductor receiver 610. The heat pipe 682 can be solid or hollow. When hollow, the heat pipe 682 can be used to circulate a material (e.g., water, oil, air) therethrough. In such a case, the heat sink 684 and/or one or more other components (e.g., a pump, a fan) (not shown) of the heat dissipation system 680 can be used to circulate the material through the heat pipe 682 and, in some cases, also the heat sink 684.

Figure 7:
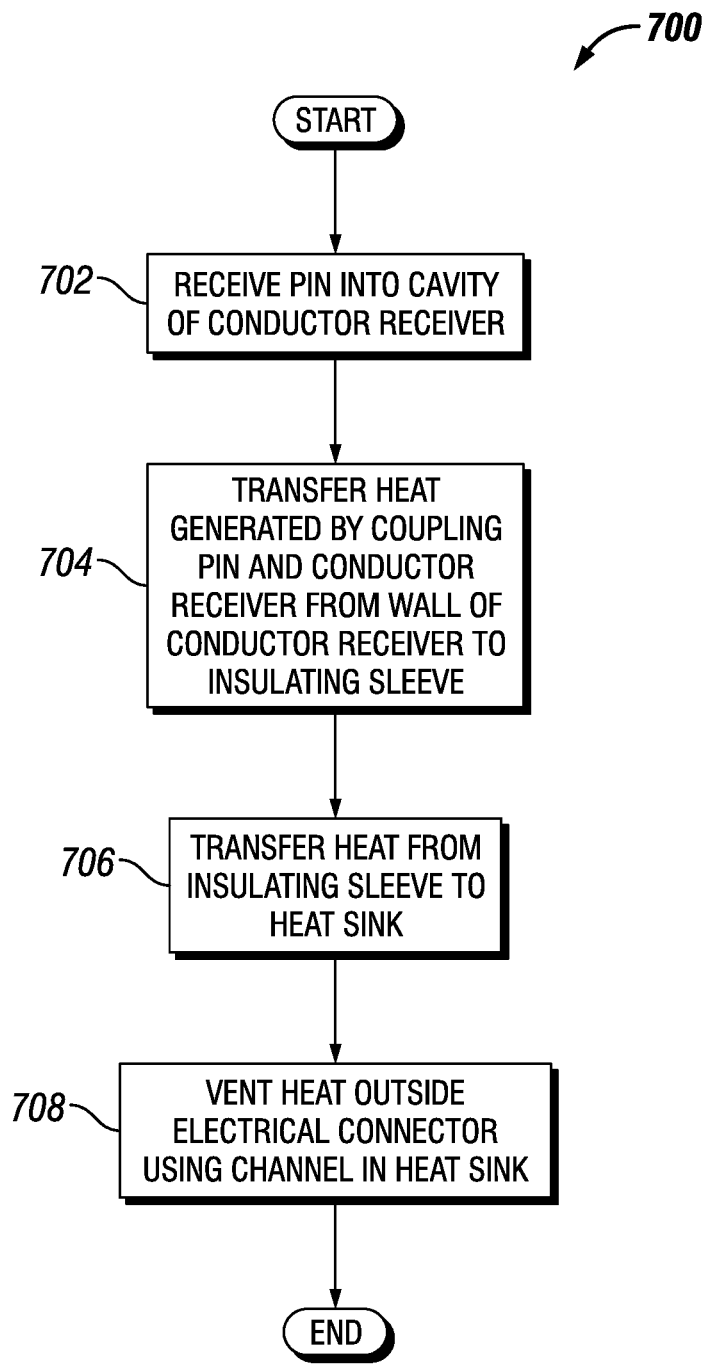
FIG. 7 shows a flowchart of a method for actively cooling an electrical connector in accordance with certain example embodiments.
Figure 8:
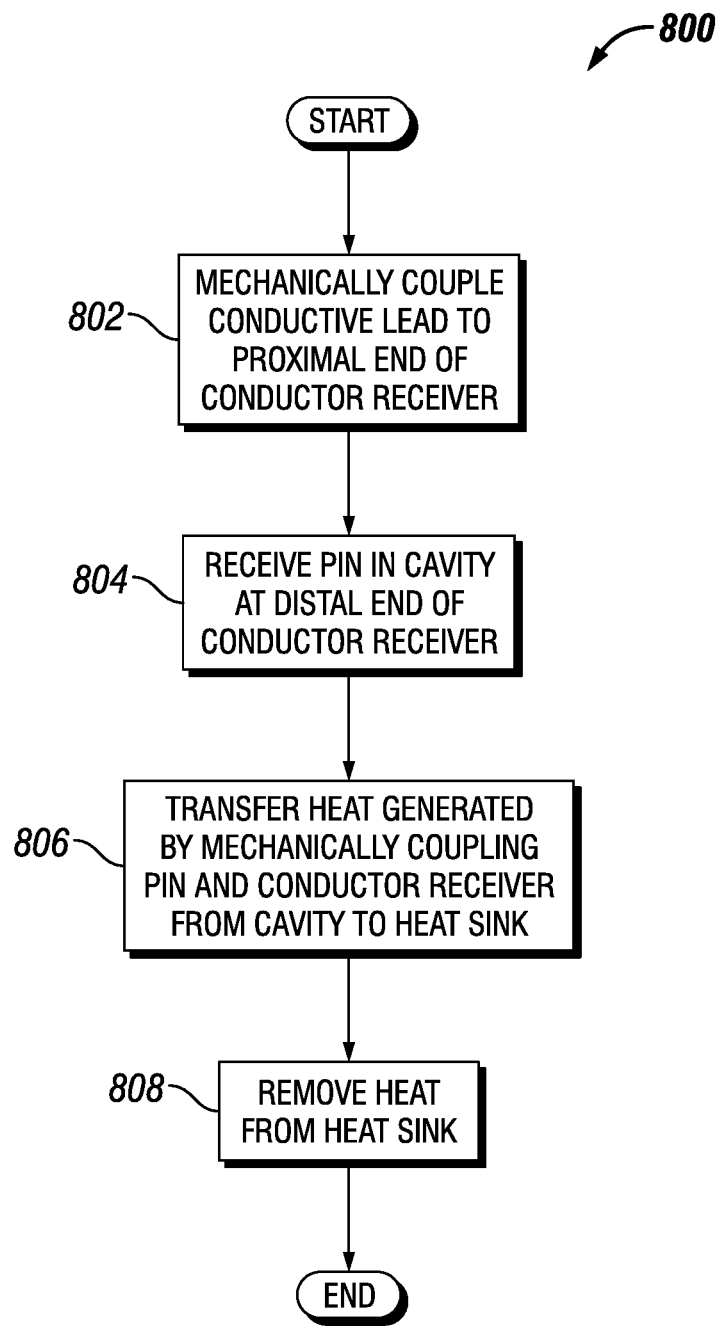
FIG. 8 shows a flowchart of an alternative method for actively cooling an electrical connector in accordance with certain example embodiments.

FIGS. 7 and 8 each shows a flowchart of a method for cooling an electrical connector in accordance with certain example embodiments. While the various steps in these flowcharts are presented and described sequentially, one of ordinary skill will appreciate that some or all of the steps may be executed in different orders, may be combined or omitted, and some or all of the steps may be executed in parallel. Further, in certain example embodiments, one or more of the steps described below may be omitted, repeated, and/or performed in a different order. In addition, a person of ordinary skill in the art will appreciate that additional steps, omitted in FIGS. 7 and 8, may be included in performing these methods. Accordingly, the specific arrangement of steps shown in FIGS. 3 and 4 should not be construed as limiting the scope.

Referring now to FIGS. 1A, 1B, and 7, one example method begins at the START step and continues to step 702. In step 702, a pin 152 is received into a cavity 122 of a conductor receiver 110. In certain example embodiments, the cavity 122 is defined by a wall 120. At least one of the pin 152 and the conductor receiver 110 can be electrically energized. The pin 152 can be part of a conductor 150. The pin 152 may be inserted into the conductor receiver 110 by a user. When the pin 152 contacts the wall 120, power is transmitted between the pin 152 and the wall 120. In such a case, the contact between the pin 152 and the wall 120 may be inefficient, causing heat 123 to be generated.

In step 704, heat 123 generated by coupling the pin 152 and the conductor receiver 110 is transferred from the wall 120 of the conductor receiver 110 to an insulating sleeve 118. In certain example embodiments, the heat 123 is transferred from the wall 120 to the insulating sleeve 118, at least in part, because of the thermal properties of the wall 120 and the insulating sleeve 118. In step 706, the heat 123 from the insulating sleeve 118 is transferred to a heat sink 116. In certain example embodiments, the heat 123 is transferred from the insulating sleeve 118 to the heat sink 116, at least in part, because of the thermal properties of the insulating sleeve 118 and the heat sink 116.

In step 708, the heat 123 is vented outside the electrical connector 100 using a channel 124 in the heat sink 116. There can be more than one channel 124 in the heat sink 116 through which the heat 123 is vented. In certain example embodiments, the heat 123 is vented outside the electrical connector 100 using a cooling device 130 located in the channel 124. In certain other example embodiments, the heat 123 is vented outside the electrical connector 100 using a heat pipe 682 disposed around the wall 622. After step 708, the method ends at the END step.

Referring now to FIGS. 2, 3, and 8, another example method begins at the START step and continues to step 802. In step 802, a conductive lead 236 is mechanically coupled to a proximal end of a conductor receiver 210. Specifically, the wires 234 of the conductive lead 236 are gathered and mechanically coupled to the proximal end of the wall 220 of the conductor receiver 210. The wires 234 can be mechanically coupled to the wall 220 using one or more of a number of fastening devices and/or methods, such as those described above with respect to FIG. 2.

In step 804, a pin 252 is received, at a distal end of the conductor receiver 210, into a cavity 222 of a conductor receiver 210. Specifically, the pin 252 of the conductor 250 is slidably coupled with a wall 220 of the conductor receiver 210 by inserting the pin 252 into a cavity 222 formed by (defined by) the wall 220. In certain example embodiments, the proximal end of the conductor receiver 210 (or, more specifically, the wall 220) has at least one aperture 234. The pin 252 may be inserted into the conductor receiver 210 by a user. When the pin 252 contacts the wall 220, at least one of the pin 252 and the conductor receiver 210 are electrically energized. In such a case, power is transmitted between the pin 252 and the wall 220. In such a case, the contact between the pin 252 and the wall 220 may be inefficient, causing heat 223 to be generated.

In step 806, heat 223 generated by mechanically coupling the pin 252 and the conductor receiver 210 is transferred from the cavity 222 of the conductor receiver 210 to a heat sink 216. In certain example embodiments, the heat 223 is transferred through the at least one aperture 224 in the wall 220. In addition, or in the alternative, the heat 223 can be transferred through the wall 220. The heat 223 can be transferred based on thermal properties of the heat sink 216, the wall 220, and the cavity 222.

In step 808, the heat 223 is removed from the heat sink 216 and/or the conductor receiver 210. In certain example embodiments, the heat 223 is removed from the heat sink 216 and/or the conductor receiver 210 using an air moving device 230. The heat 223 can be removed from the heat sink 216 and/or the conductor receiver 210 based, at least in part, on thermal properties of the heat sink 216 and an outer component 212. After step 808, the method ends at the END step.

Figure 9A:
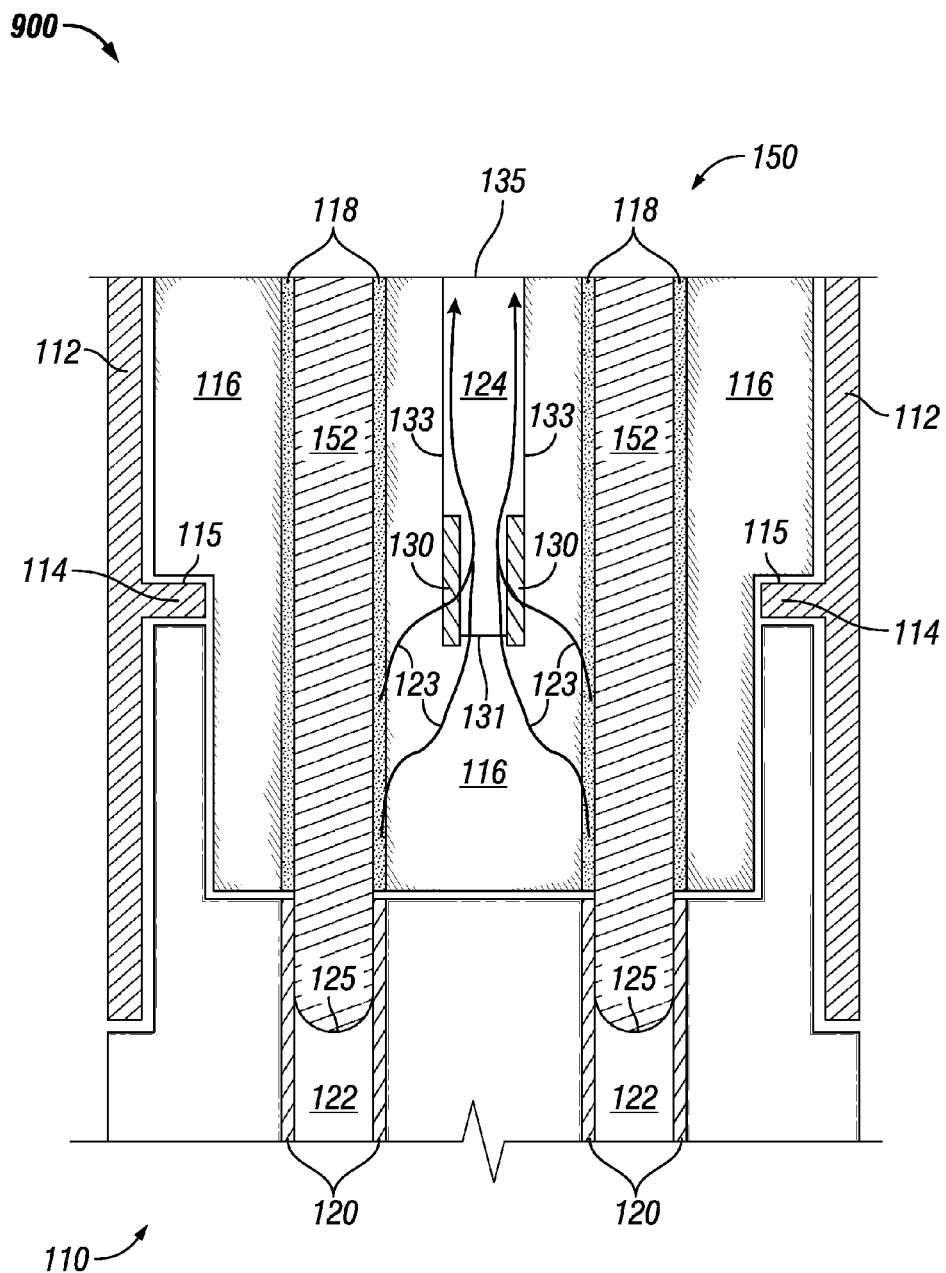
FIGS. 9A and 9B show a cross-sectional side view and a top view, respectively, of an electrical connector with a substantially reversed orientation compared to the electrical connector of FIGS. 1A and 1B in accordance with certain example embodiments.

FIGS. 9A-14B show the embodiments of FIGS. 1A-6B, except that the pins and the conductor receivers for each embodiment have changed places for each electrical connector. In FIGS. 9A and 9B, the conductor 150 is, in part, embedded in the heat sink 116. As such, the proximal end of the pins 152 are surrounded by an insulating sleeve 118, which is disposed in the heat sink 116. The distal end 125 of the pins 152 extend beyond the insulating sleeve 118 and the heat sink 116. The conductor receiver 110 is inserted over the exposed pins 152 so that the distal end 125 of the pins 152 are disposed within the cavity 122 and contact the wall 120 of each conductor receiver 110.

Figure 9B:
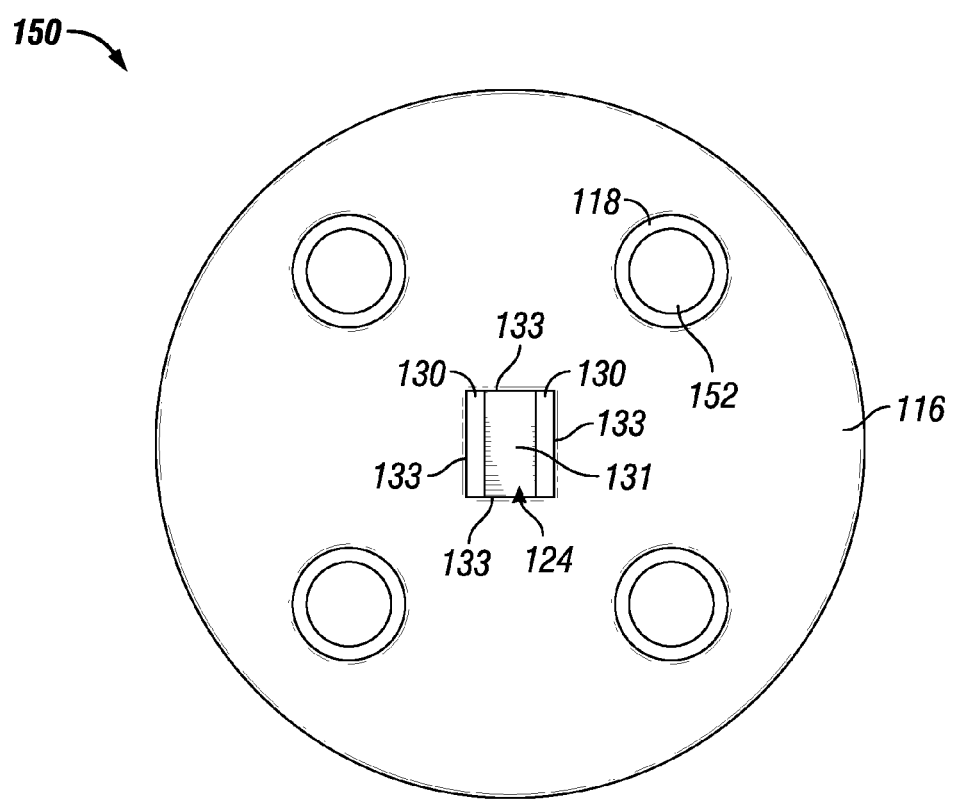
Figure 10:
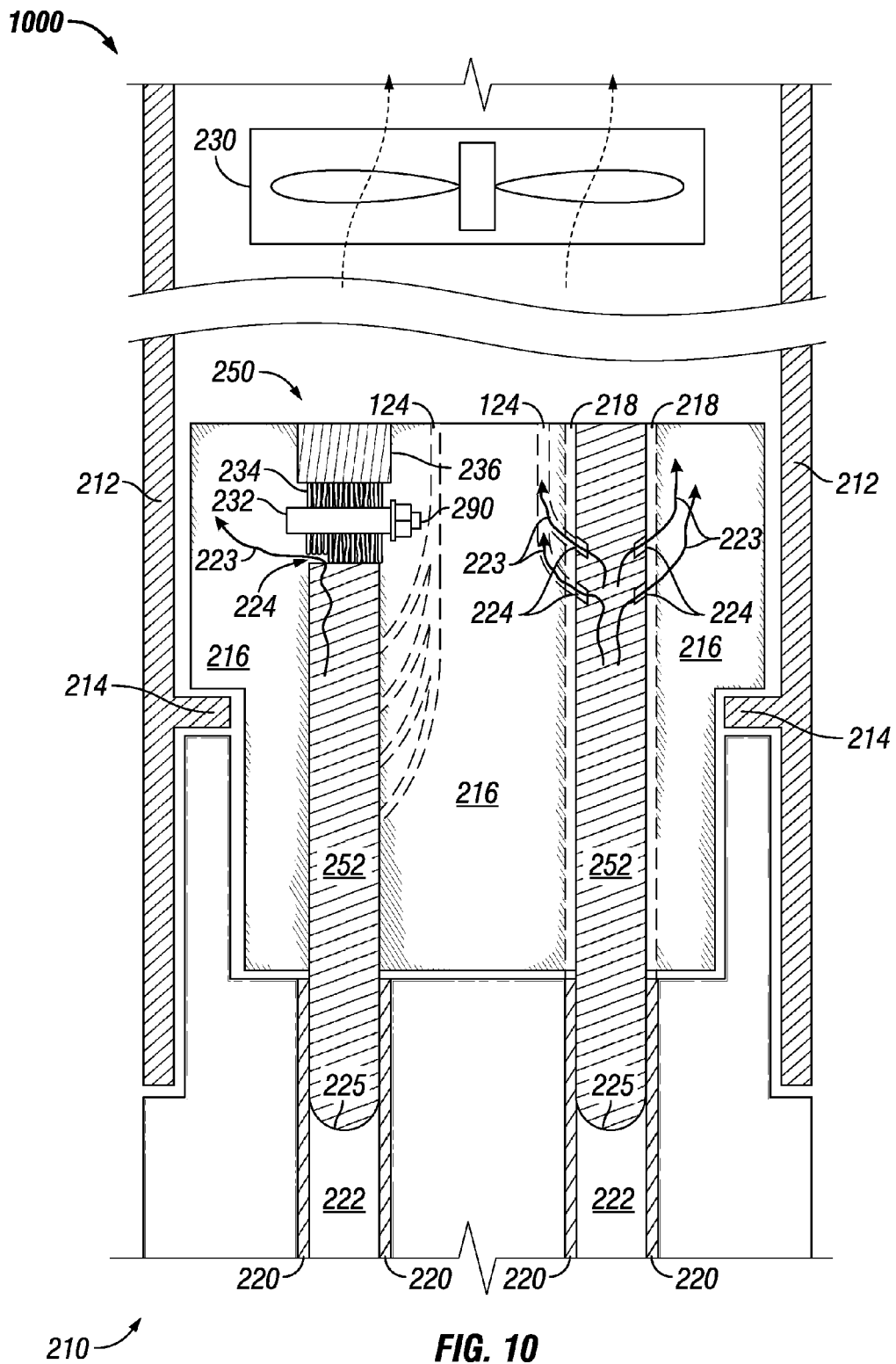
FIG. 10 shows an electrical connector with a substantially reversed orientation compared to the electrical connector of FIG. 2 in accordance with certain example embodiments.

In FIG. 10, the conductor receiver 210 is substantially the same as the conductor receiver 110 of FIGS. 9A and 9B. As for the conductor 250, the wires 234 of the conductive lead 236, disposed (at least in part) within a heat sink 216, are mechanically coupled to a portion of the proximal end of the left pin 252, also disposed (at least in part) within the heat sink 216, using a wire clamp 232 that wraps around the wires 234. An aperture 224 or gap 224 results between the wires 234 and the proximal end of the pin 252. The heat 223 generated within the pin 252 and/or the conductive lead 236 can vent at the aperture 224 or gap 224 and be absorbed by the heat sink 216. As another example, as shown in the right pin 252, the pin 252 can have one or more apertures 224 that traverse some or all of the width of the pin 252. In either case, ventilation can occur through the apertures 224 so that the heat 223 that ventilates through the apertures 224 are absorbed by the heat sink 216. As discussed above with respect to FIG. 2, the heat sink 216 can include one or more channels 124 that help vent heat from the apertures 224 and/or portions of a pin 252. Also as discussed above with respect to FIG. 2, a cooling device 230 can be used to remove the heat from the heat sink 216. In the case of the example of FIG. 10, the cooling device 230 is located proximate to the top end of the conductor 250 and draws heat away from the heat sink 216.

Figure 11:
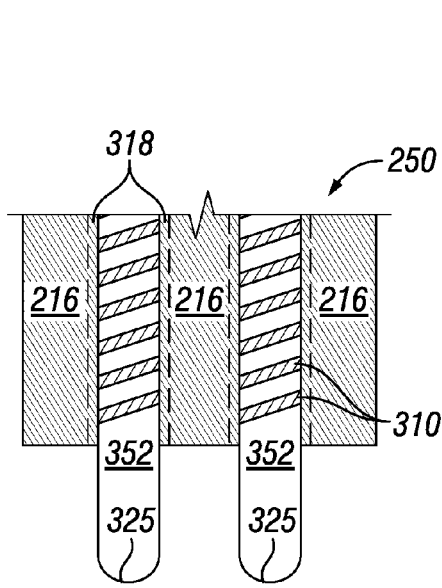
FIG. 11 shows an electrical connector with a substantially reversed orientation compared to the electrical connector of FIG. 3, in accordance with certain example embodiments.
Figure 12:
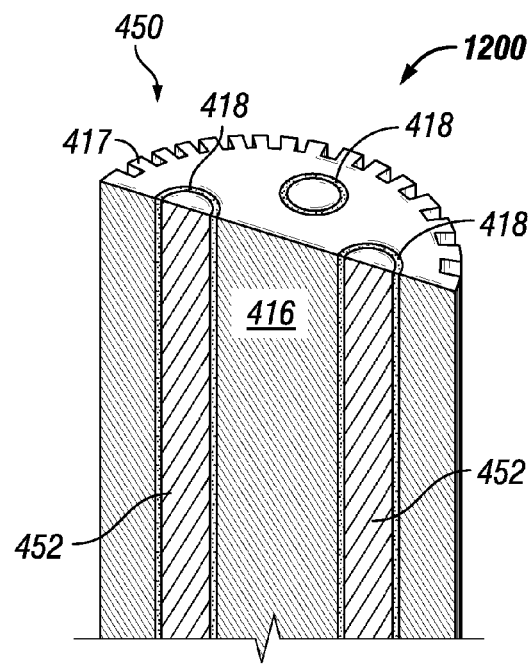
FIG. 12 shows an electrical connector with a substantially reversed orientation compared to the electrical connector of FIG. 4 in accordance with certain example embodiments.
Figure 13:
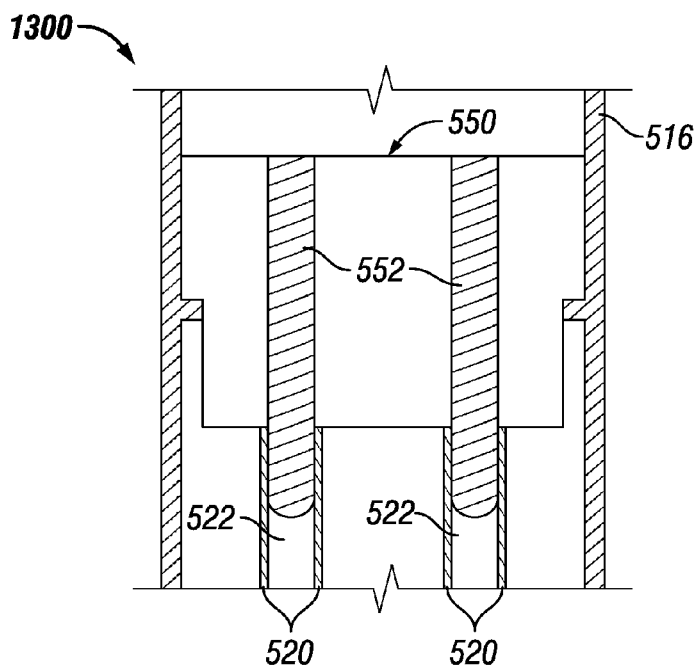
FIG. 13 shows an electrical connector with a substantially reversed orientation compared to the electrical connector of FIG. 5 in accordance with certain example embodiments.
Figure 14A:
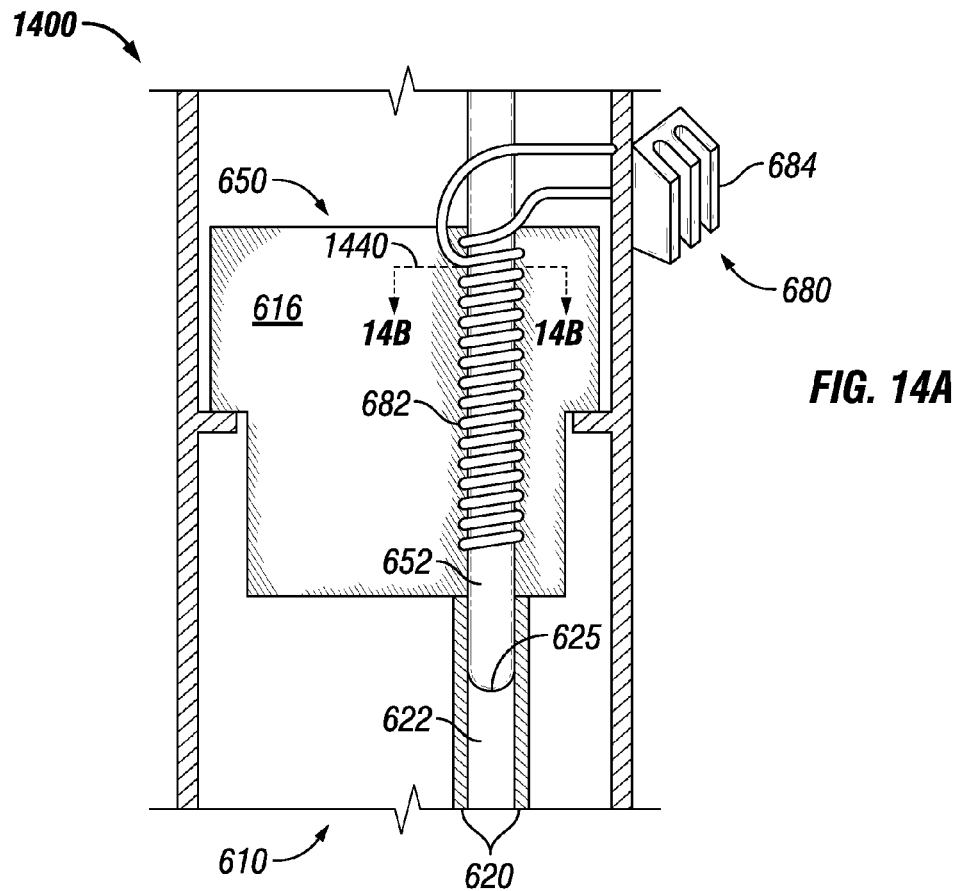
FIGS. 14A and 14B show an electrical connector with a substantially reversed orientation compared to the electrical connector of FIGS. 6A and 6B in accordance with certain example embodiments.
Figure 14B:
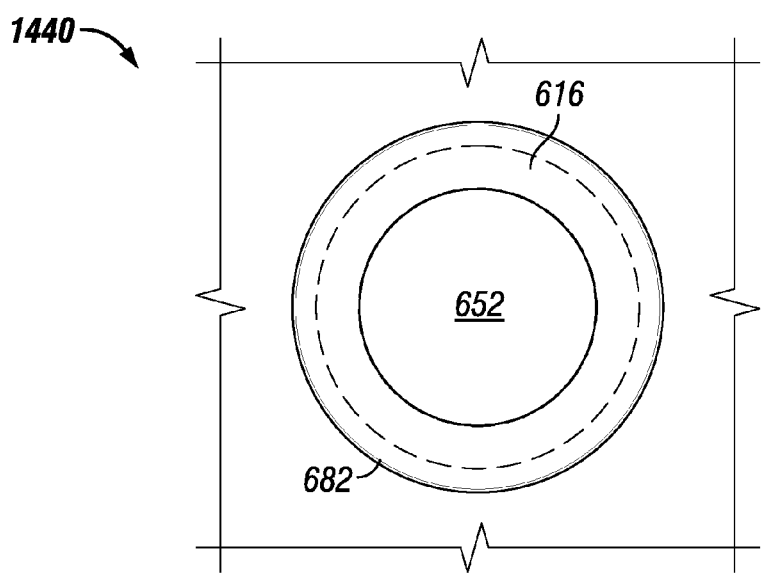

In FIG. 11, the pins 352 of the conductor receiver 210 have serrations 310 along some or all of their length. Optionally, each of the pins 352 can be surrounded by an insulating sleeve 318, which can be substantially the same as the insulting sleeve 118 and the insulating sleeve 218 discussed above. In FIG. 12, the heat sink 416 in which the pins 452 are disposed can have one or more fins disposed on its outer edge. Each of the pins 452 can be surrounded by an insulating sleeve 418. In FIG. 13, the pins 552 are press-fit, overmolded, or otherwise inserted into the insulator body 518. In FIGS. 14A and 14B, the heat pipe 682 wraps around the pin 652 of the conductor 650. The pin 652 can be surrounded by a thermally insulating material 616, in which case the heat pipe 682 wraps around both the thermally insulating material 616 and the pin 652.

Example embodiments provide for active cooling of electrical connectors. Specifically, example embodiments provide for actively cooling inner portions of an electrical connector by removing heat generated by imperfections and/or inefficiencies of the transfer of electrical power between a pin and a wall. Specifically, when the pin is slidably coupled within the wall, the physical contact between the pin and the wall may not be completely efficient. Inefficiencies can be caused by one or more of a number of factors, including but not limited to uneven surfaces in the pin and/or wall, debris (e.g., dirt, grease, dust) on the pin and/or the inner surface of the wall, and conductive material used.

By improving the removal of excess heat generated between a conductor and a conductor receiver, the temperature rise at the connection point(s) is effectively lowered. In other words, because the excess heat generated by the contact between the conductor and conductor receiver is removed, the loss of additional energy (which results in additional heat) is reduced. In some cases, thermal losses can be caused by wear with the conductor and/or the conductor receiver, causing decreasingly efficient contact between these components with increased wear. Example embodiments reduce the effects of (compensate for) the higher thermal losses caused by increased mechanical wear.

In addition, example embodiments allow for savings in cost and material with respect to electrical connectors. Specifically, engineers designing an electrical system can use a more appropriate size (voltage and/or amperage rating) of connector because, using example active cooling systems, heat losses are minimized and voltage and/or amperage requirements are more precise. As such, less cost and material is required for a particular electrical connector because smaller electrical connectors require less material.

In addition, the use of example active cooling systems in an electrical connector can provide one or more of a number of electrical and/or mechanical benefits relative to the electrical connector. Such benefits can include, but are not limited to, strain relief, ease of coupling and decoupling of the electrical connector, ease of maintenance, reduced occurrence of an over-temperature situation, reduced occurrence of an over-current situation, and reduced occurrence of a ground fault situation and/or other short circuit situations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical connector, comprising:
   a conductor receiver comprising a wall comprising an electrically conductive material forming a cavity; and
   a connector body mechanically coupled to the conductor receiver, wherein the connector body comprises:
      a pin that is electrically conductive, wherein the pin has a distal end and a proximal end, wherein the distal end is disposed within the cavity of the conductor receiver and is mechanically coupled to the wall of the conductor receiver;
      an electrically insulating sleeve mechanically coupled to and disposed around the proximal end of the pin;
      a heat sink disposed against an outer surface of the electrically insulating sleeve, wherein the heat sink comprises a body defined by an outer perimeter, wherein the outer perimeter comprises a top surface of the body of the heat sink; and
      a channel disposed within the body of the heat sink, wherein the channel comprises a top end, a bottom end, and at least one side end disposed between the top end and the bottom end to define a height of the channel, wherein the at least one side wall encompasses the height of the channel, wherein the top end of the channel is exposed at the outer perimeter of the body of the heat sink, wherein the bottom end and each side end of the at least one side end of the channel are disposed within and enclosed by the body of the heat sink, wherein the channel collects heat absorbed by the heat sink from the proximal end of the pin through the electrically insulating sleeve, wherein the heat collected by the channel is ventilated outside the connector body through the top end of the channel.

2. The electrical connector of claim 1, wherein the conductor further comprises:
   a cooling device disposed within the channel, wherein the cooling device induces the heat from the heat sink and forces the heat out of the channel.

3. The electrical connector of claim 2, wherein the cooling device is a thermoelectric cooler.

4. The electrical connector of claim 3, wherein the cooling device is an air moving device.

5. The electrical connector of claim 3, wherein the cooling device uses liquid cooling.

6. The electrical connector of claim 1, wherein the insulating sleeve comprises a material having dielectric integrity.

7. The electrical connector of claim 1, wherein the connector body further comprises an outer component mechanically coupled to the heat sink.

8. The electrical connector of claim 1, wherein the connector body further comprises:
   a heat pipe disposed around an outer portion of the pin.

9. The electrical connector of claim 8, wherein the heat sink is thermally coupled to a proximal end of the heat pipe.

10. The electrical connector of claim 8, wherein the heat pipe is hollow, and wherein the heat pipe receives a material that circulates therethrough.

11. The electrical connector of claim 1, wherein the pin comprises at least one spiral serration that is cut into an outer surface of the pin.

12. The electrical connector of claim 1, wherein the heat sink is made of a thermally conductive dielectric polymer.

13. The electrical connector of claim 1, wherein the electrically insulating sleeve comprises a material that has high dielectric strength and a thin profile.

14. An electrical connector, comprising:
   a conductor receiver comprising a wall forming a cavity, wherein the wall comprises an electrically conductive material; and
   a connector body mechanically coupled to the conductor receiver, wherein the connector body comprises:
      a pin that is electrically conductive, wherein the pin has an outer perimeter that defines a body, wherein the body of the pin has a distal end and a proximal end, wherein the distal end of the pin is received in the cavity of the conductor receiver and is mechanically coupled to the wall of the conductor receiver, and wherein the proximal end of the body of the pin comprises at least one aperture that originates at the outer perimeter and extends into the body of the pin; and
      a heat sink disposed against an outer surface of the proximal end of the pin, wherein the heat sink comprises a dielectric material of high thermal conductivity and low electrical conductivity,
      wherein the at least one aperture forms a gap between the pin and the heat sink, and wherein the at least one aperture is formed primarily to vent heat from the pin to the heat sink.

15. The electrical connector of claim 14, wherein the at least one aperture comprises a serration in the outer perimeter of the body at the proximal end of the pin.

16. The electrical connector of claim 14, wherein the proximal end of the pin is mechanically coupled to a conductive lead, where in the conductive lead comprises a plurality of wires and a wire clamp that wraps around the plurality of wires.

17. The electrical connector of claim 16, further comprising:
an air moving device positioned proximate to the at least one aperture, wherein the air moving device induces the heat from the heat sink away from the heat sink.

18. The electrical connector of claim 14, wherein the pin comprises a thermally conductive dielectric polymer disposed on the outer surface of the pin, and wherein the heat sink comprises an electrically conductive material.

19. An electrical connector, comprising:
a connector end comprising a pin that is electrically conductive; and
a conductor receiver mechanically coupled to the connector end, wherein the conductor receiver comprises:
a wall comprising an electrically conductive material forming a cavity into which the pin, wherein the pin abuts against the wall;
an electrically insulating sleeve disposed against an outer surface of the wall;
a heat sink disposed against an outer surface of the electrically insulating sleeve, wherein the heat sink comprises a body defined by an outer perimeter, wherein the outer perimeter comprises a top surface of the body of the heat sink; and
a channel disposed within the body of the heat sink, wherein the channel comprises a top end, a bottom end, and at least one side end disposed between the top end and the bottom end to define a height of the channel, wherein the at least one side wall encompasses the height of the channel, wherein the top end of the channel is exposed at the outer perimeter of the body of the heat sink, wherein the bottom end and each side end of the at least one side end of the channel are disposed within and enclosed by the body of the heat sink, wherein the channel collects heat absorbed by the heat sink,
wherein the heat collected by the channel is ventilated outside the conductor receiver through the top end of the channel, and
wherein power transfers between the connector end and the conductor receiver when the connector end and the conductor receiver are coupled to each other.

* * * * *